United States Patent
Wang et al.

(10) Patent No.: US 10,663,589 B2
(45) Date of Patent: May 26, 2020

(54) LASER INTERFEROMETER SYSTEM FOR MEASURING SIX DEGREES OF FREEDOM WITH RESPECT TO A LINEAR AXIS

(71) Applicant: National Yunlin University of Science and Technology, Douliou, Yunlin County (TW)

(72) Inventors: Yung-Cheng Wang, Douliou (TW); Lih-Horng Shyu, Douliou (TW); Chung-Ping Chang, Douliou (TW); Hung-Ta Shih, Douliou (TW); Pi-Cheng Tung, Douliou (TW)

(73) Assignee: National Yunlin University of Science and Technology, Douliou, Yunlin County (TW)

( * ) Notice: Subject to any disclaimer, the term of this patent is extended or adjusted under 35 U.S.C. 154(b) by 0 days.

(21) Appl. No.: 16/371,723

(22) Filed: Apr. 1, 2019

(65) Prior Publication Data
US 2019/0302263 A1 Oct. 3, 2019

(30) Foreign Application Priority Data
Apr. 2, 2018 (TW) .............................. 107111622 A (51) Int. Cl.
*G01B 9/02* (2006.01)
*G01S 17/66* (2006.01)
*G01P 13/00* (2006.01)

(52) U.S. Cl.
CPC .............. *G01S 17/66* (2013.01); *G01P 13/00* (2013.01)

(58) Field of Classification Search
CPC ..... G01S 17/66; G01P 13/00; G01B 9/02017; G01B 9/02018; G01B 2290/15; G01B 2290/45; G01B 2290/70
USPC ........................................................ 356/493
See application file for complete search history.

(56) References Cited

U.S. PATENT DOCUMENTS

| | | | | |
|---|---|---|---|---|
| 5,400,143 A | * | 3/1995 | Bauer ................ | G01B 9/02021 356/485 |
| 8,441,649 B2 | * | 5/2013 | Wang ..................... | G01B 11/14 356/493 |
| 2003/0053074 A1 | * | 3/2003 | Hill ........................ | B82Y 10/00 356/500 |
| 2003/0053079 A1 | * | 3/2003 | Hill ..................... | G03F 7/70775 356/520 |
| 2003/0164948 A1 | * | 9/2003 | Hill .................... | G01B 9/02019 356/487 |

(Continued)

*Primary Examiner* — Tarifur R Chowdhury
*Assistant Examiner* — Jonathon Cook
(74) *Attorney, Agent, or Firm* — Muncy, Geissler, Olds & Lowe, P.C.

(57) ABSTRACT

A laser interferometer system includes a beam splitter to split a laser beam into first and second beam sets, a first retroreflector mounted to an object to reflect the first beam set, a first detecting device for detecting movements of the object in x-, y- and z-axis directions based on the reflected first beam set, a second retroreflector mounted to the object to reflect the second beam set, and a second detecting device for detecting rotations and movements of the object with respect to the y- and z-axis directions based on the reflected second beam set. The movements of the object in the z-axis direction obtained by the first and second detecting devices are used to obtain a rotation of the object with respect to the x-axis direction.

13 Claims, 5 Drawing Sheets

(56) References Cited

U.S. PATENT DOCUMENTS

2006/0087659 A1\* 4/2006 Schlucter ............ G03F 7/70775
356/500
2017/0167849 A1\* 6/2017 Feng ...................... G01B 11/02

\* cited by examiner

LASER INTERFEROMETER SYSTEM FOR MEASURING SIX DEGREES OF FREEDOM WITH RESPECT TO A LINEAR AXIS

CROSS-REFERENCE TO RELATED APPLICATION

This application claims priority of Taiwanese Invention Patent Application No. 107111622, filed on Apr. 2, 2018.

FIELD

The disclosure relates to a laser interferometer system, and more particularly to a laser interferometer system that is capable of measuring six degrees of freedom (6DoF) of an object moving along a linear axis.

BACKGROUND

Laser measuring tools are used to achieve contactless measurement of a moving distance of an object. Such measurement does not impact the surface of the object, and is advantageous in having wide measuring range, high measuring speed and high precision. In precision industries, laser measuring tools may be used to detect a moving distance of an object in a machine tool for ensuring that the movement of the object is precise enough for precision machining. Conventional laser measuring tools are capable of detecting the linear movements (moving distances) of the object in x-axis, y-axis, z-axis directions, but are unable to measure rotations (rotation angles) of the object.

SUMMARY

Therefore, an object of the disclosure is to provide a laser interferometer system for measuring 6DoF of an object that moves along a linear axis.

According to the disclosure, the laser interferometer system is adapted for measuring six degrees of freedom of an object that moves in an x-axis direction. The laser interferometer system includes a light source unit, a beam splitter unit, a transflective unit, a first retroreflector, a first detecting device, a second retroreflector, and a second detecting device. The light source unit is for emitting a laser beam in the x-axis direction. The beam splitter unit is disposed downstream of the light source unit to split the laser beam emitted by the light source unit into a plurality of detection beams that are classified into at least a first detection beam set and a second detection beam set. The transflective unit is disposed downstream of the beam splitter unit for receiving the first detection beam set from the beam splitter unit, and is configured to permit passage of the first detection beam set received from the beam splitter unit. The first retroreflector is to be mounted to the object, and is disposed downstream of the transflective unit to reflect the first detection beam set passing through the transflective unit and traveling in the x-axis direction back toward the transflective unit. The first detecting device is disposed on an opposite side of the transflective unit with respect to the first retroreflector for receiving the first detection beam set reflected by the first retroreflector, and includes a first detecting unit for detecting an x-axis movement of the object in the x-axis direction based on a part of the first detection beam set received thereby, and a second detecting unit for detecting a first y-axis movement and a first z-axis movement of the object respectively in a y-axis direction and a z-axis direction based on a part of the first detection beam set received thereby. The x-axis direction, the y-axis direction and z-axis direction are perpendicular to each other. The second retroreflector is to be mounted to the object, and is disposed to reflect the second detection beam set traveling in the x-axis direction. The second detecting device is disposed to receive the second detection beam set reflected by the second retroreflector, and includes a third detecting unit for detecting a y-axis rotation and a z-axis rotation of the object with respect to the y-axis direction and the z-axis direction, respectively, based on a part of the second detection beam set received thereby, and a fourth detecting unit for detecting a second y-axis movement and a second z-axis movement of the object respectively in the y-axis direction and the z-axis direction based on a part of the second detection beam set received thereby. The first z-axis movement and the second z-axis movement are cooperatively used to obtain an x-axis rotation of the object with respect to the x-axis direction.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
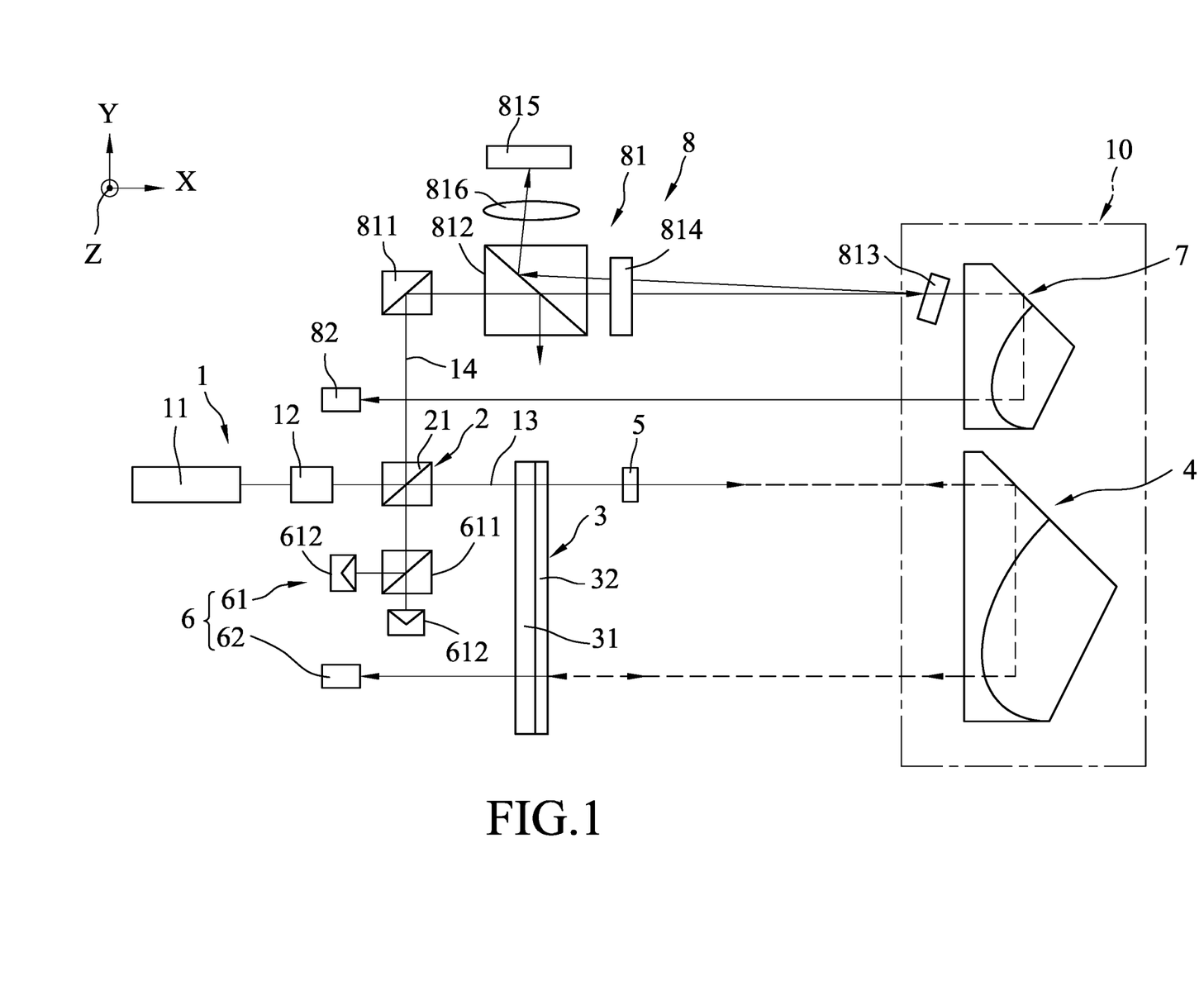
FIG. 1 is a schematic diagram illustrating a top view of a first embodiment of the laser interferometer system according to the disclosure.

Referring to FIG. 1, the first embodiment of the laser interferometer system according to this disclosure is adapted to measure 6DoF of an object 10 that linearly moves (for ease of expression, the term "movement" refers to linear movement) in an x-axis direction (a direction parallel to an x-axis (X)). In this embodiment, the 6DoF of the object 10 refers to movement (distance) in the x-axis direction, movement in a y-axis direction (a direction parallel to a y-axis (Y)), movement in a z-axis direction (a direction parallel to a z-axis (Z)), rotation (angle) with respect to the x-axis direction (also called "roll"), rotation with respect to the y-axis direction (also called "pitch") and rotation with respect to the z-axis direction (also called "yaw"), where the x-axis (X), the y-axis (Y) and the z-axis (Z) are perpendicular to each other. The laser interferometer system is used to measure variation in 6DoF that may occur when the object moves linearly. In this embodiment, the laser interferometer system emits multiple detection beams toward the object 10 in the x-axis direction parallel to a horizontal plane formed by the x-axis (X) and the y-axis (Y); the y-axis direction is a left-and-right direction with respect to the x-axis direction and parallel to the horizontal plane; and the z-axis is an up-and-down direction perpendicular to the horizontal plane. The laser interferometer system includes a light source unit 1, a beam splitter unit 2, a transflective unit 3, a first retroreflector 4, an octadic-wave plate (⅛ wave plate) 5, a first detecting device 6, a second retroreflector 7 and a second detecting device 8. It is noted that the first and second retroreflectors 4, 7 are exemplified as, but not limited to, corner cube retroreflectors in this embodiment, and can be other types of retroreflectors in other embodiments.

The light source unit 1 includes a light source 11 and an optical isolator 12. The light source 11 may be, for example, a He—Ne laser emitter, which emits a linearly polarized beam that travels along an optical axis of the light source 11 which extends in the x-axis direction and that passes through the optical isolator 12, but this disclosure is not limited to the type of the laser beam. The optical isolator 12 is used to prevent light that travels in an opposite direction from interfering with operation of the light source 11.

The beam splitter unit 2 is disposed downstream of the light source unit 1 to split the laser beam emitted by the light source unit 1 into a plurality of detection beams. In this disclosure, the detection beams are classified into different detection beam sets based on the targets the detection beams are directed to. For example, the detection beam(s) directed to the first retroreflector 4 is(are) classified into a first detection beam set; the detection beam(s) directed to the second retroreflector 7 is(are) classified into a second detection beam set. In this embodiment, the beam splitter unit 2 includes a first beam splitter 21 disposed to split the laser beam from the light source unit 1 into a first detection beam 13 (belonging to the first detection beam set) and a second detection beam 14 (belonging to the second detection beam set). The first detection beam 13, which is a part of the laser beam that passed through the first beam splitter 21, travels along the optical axis of the light source 11 and passes through the transflective unit 3. The second detection beam 14, which is a part of the laser beam that was reflected by the first beam splitter 21, travels in the y-axis direction toward the second detecting device 8.

The transflective unit 3 is disposed downstream of the beam splitter unit 2, and includes a glass substrate 31 that is disposed between the beam splitter unit 2 and the first retroreflector 4 and that is substantially perpendicular to the x-axis direction, and a reflective film 32 that is formed on a surface of the glass substrate 31 facing the first retroreflector 4. The transflective unit 3 permits passage of a part of the first detection beam 13, and reflects a part of the first detection beam 13 back toward the first beam splitter 21.

The first retroreflector 4 is adapted to be mounted to the object 10, so as to change its position with the linear movement (i.e., change of position/location in a linear direction, hereinafter simplified as "movement") and the rotation of the object 10. Accordingly, the movement and the rotation of the object 10 may be derived by detecting the beam reflected by the first retroreflector 4. The first retroreflector 4 is disposed downstream of the transflective unit 3 to reflect the first detection beam 13 coming from the transflective unit 3 and traveling in the x-axis direction back toward the transflective unit 3. The transflective unit 3 and the first retroreflector 4 cooperatively form, or define, an optical cavity therebetween, and the first detection beam 13 that enters the optical cavity may repeatedly travel back and forth along an optical path formed by, as exemplified in FIG. 1, an upper part of the transflective unit 3, an upper part of the first retroreflector 4, a lower part of the first retroreflector 4 and a lower part of the transflective unit 3.

The octadic-wave plate 5 is disposed between the transflective unit 3 and the first retroreflector 4.

A part of the first detection beam 13 that passed through the upper part of the transflective unit 3 would pass through the octadic-wave plate 5 and enter the first retroreflector 4 from the upper part of the first retroreflector 4, and then be reflected by the first retroreflector 4. The reflected beam exits the first retroreflector 4 from the lower part of the first retroreflector 4 and is directed to the lower part of the transflective unit 3. The beam that arrives at the lower part of the transflective unit 3 would partly pass through the transflective unit 3, and partly be reflected. The reflected part would be transmitted back to the upper part of the transflective unit 3 along the original optical path (i.e., through the lower part of the retroreflector 4, the upper part of the retroreflector 4, and the octadic-wave plate 5), and then partly pass through and partly be reflected by the upper part of the transflective unit 3. The reflected part would be transmitted along the abovementioned optical path again, resulting in repeated reflection between the transflective unit 3 and the first retroreflector 4. The first retroreflector 4 has several reflective surfaces, and has a structure that is known to skilled persons in the art, so details thereof are omitted herein for the sake of brevity. In this embodiment, the first retroreflector 4 has a surface facing the x-axis direction for entrance of the first detection beam 13.

The space between the first retroreflector 4 and the transflective unit 3 forms a resonant optical cavity, such that a part of the first detection beam 13 travels back and forth and repeatedly passes through the octadic-wave plate 5 between the first retroreflector 4 and the transflective unit 3. Since the octadic-wave plate 5 would make the beam passing therethough have a phase shift, the octadic-wave plate 5 is employed to cause beams resulting from reflections of the first detection beam 13 to form an interference beam having an orthogonal phase-shifting fringe. By virtue of the configuration of the reflective surfaces of the first retroreflector 4, the reflected beam would be parallel to the incident beam. Accordingly, when the first retroreflector 4 moves with the object 10, although tilt angle (pitch, yaw) errors may be induced and cause the transflective unit 3, the octadic-wave plate 5 and an incident surface of the first retroreflector 4 to no longer be parallel to each other, the orthogonal phase shift fringe pattern of the interference beam would still be clear. During the repeated reflections of the first detection beam 13 between the first retroreflector 4 and the transflective unit 3, which may cause multiple passages of the first detection beam 13 through the octadic-wave plate 5, a part of the interference beam would pass through the transflective unit 3 and travel to the first beam splitter 21.

The first detecting device 6 is disposed on an opposite side of the transflective unit 3 with respect to the first retroreflector 4 for receiving the first detection beam 13 reflected by the first retroreflector 4, and includes a first detecting unit 61 for detecting an x-axis movement of the object 10 in the x-axis direction based on the interference beam (formed by a part of the first detection beam 13) received thereby, and a second detecting unit 62 for detecting a first y-axis movement and a first z-axis movement of the object 10 (more precisely, a part of the object 10 corresponding to the first retroreflector 4 in position) respectively in the y-axis direction and the z-axis direction based on a part of the first detection beam 13 received thereby.

In this embodiment, the first detecting unit 61 includes a polarizing beam splitter 611 and two photodetectors 612. When the interference beam travels from the upper part of transflective unit 3 and reaches the first beam splitter 21, the first beam splitter 21 reflects the interference beam to the polarizing beam splitter 611. The polarizing beam splitter 611 is disposed to split the interference beam into two split interference beams that are perpendicular to each other in polarization (i.e., the two split interference beams are orthogonal). The photodetectors 612 are disposed to receive the split interference beams, respectively, and are configured to generate, in response to the split interference beams received thereby, signals that can be used by a processor (not shown) for analysis of the split interference beams to obtain the x-axis movement of the object 10. In practice, the orthogonal split interference beams may form a two-dimensional Lissajous figure of which a cycle indicates a displacement of $\lambda/4$ ($\lambda$: a wavelength of the laser beam) for the object 10, and the x-axis movement can be obtained based on a number of the cycles of the Lissajous figure.

During the repeated reflections of the first detection beam 13 between the first retroreflector 4 and the transflective unit 3 and passing through the octadic-wave plate 5, every time the first detection beam 13 arrives at the lower part of the transflective unit 3 by reflection of the first retroreflector 4, the first detection beam 13 would partly be reflected by and partly pass through the lower part of the transflective unit 3. In the final reflection by the first retroreflector 4, the part of the first detection beam 13 that is to pass through the lower part of the transflective unit 3 travels along an optical path that does not pass through the octadic-wave plate 5, and then arrives at and passes through the lower part of the transflective unit 3. The second detecting unit 62 is disposed to, every time when the first detection beam 13 travels from the first retroreflector 4 toward the lower part of the transflective unit 3, receive the part of the first detection beam 13 that has passed through the lower part of the transflective unit 3, so as to detect the first y-axis movement and the first z-axis movement of the object 10. When the object 10 has a moving distance of d in the y-axis direction or the z-axis direction, variation of the optical path of the first detection beam 13 at the second detecting unit 62 after reflection by the first retroreflector 4 would be 2d, achieving higher sensitivity of detection and thus higher precision for the detection result. In practice, the second detecting unit 62 may include a quadrant detector (QD), a position sensing detector (PSD), a charge-coupled device (CCD), a complementary metal-oxide-semiconductor (CMOS) sensor, or a charge injection device (CID).

As described above, the first detection beam 13 in the first embodiment can be divided into two detection parts, one of which is received and analyzed by the first detecting unit 61, and the other one of which is received and analyzed by the second detecting unit 62. The specific structure of the laser interferometer system enables the two detection parts to travel along a common optical path and to be used to measure/detect displacement of the object 10 in a direction in which the object 10 moves (e.g., the x-axis movement) and displacements of the object 10 in a direction perpendicular to that in which the object 10 moves (e.g., the y-axis and z-axis movements), which is both novel and practical.

The second retroreflector 7 is adapted to be mounted to the object 10 and separated from the first retroreflector 4 in the y-axis direction, and is disposed to reflect the second detection beam 14 traveling in the x-axis direction. The second retroreflector 7 includes several reflective surfaces, and has a structure that is known to skilled persons in the art, so details thereof are omitted herein for the sake of brevity.

In this embodiment, the second retroreflector 7 has a surface facing the x-axis direction for entrance of the second detection beam 14.

The second detecting device 8 is disposed to receive the second detection beam 14 reflected by the second retroreflector 7, and includes a third detecting unit 81 for detecting a y-axis rotation and a z-axis rotation of the object 10 with respect to the y-axis direction (i.e., rotation around an axis parallel to the y-axis (Y)) and the z-axis direction (i.e., rotation around an axis parallel to the z-axis (Z)), respectively, based on a part of the second detection beam 14 received thereby, and a fourth detecting unit 82 for detecting a second y-axis movement and a second z-axis movement of the object 10 (more precisely, a part of the object 10 corresponding to the second retroreflector 7 in position) respectively in the y-axis direction and the z-axis direction based on apart of the second detection beam 14 received thereby.

In this embodiment, the third detecting unit 81 includes a reflector 811, a polarizing beam splitter 812, a transflective mirror 813, a quarter-wave plate (¼ wave plate) 814, a position sensing detector 815, and a condensing lens 816. The condensing lens 816 and the polarizing beam splitter 812 are arranged in the y-axis direction and the condensing lens 816 is disposed between the polarizing beam splitter 812 and the position sensing detection 815.

Apart of the laser beam emitted by the light source unit 1 is reflected by the first beam splitter 21 toward the reflector 811 in the y-axis direction and forms the second detection beam 14. The reflector 811 reflects the second detection beam 14 toward the polarizing beam splitter 812 in the x-axis direction. In this embodiment, the reflector 811 is exemplified by abeam splitter, but may be a reflective mirror in other embodiments. The polarizing beam splitter 812 is disposed to permit passage of the second detection beam 14 reflected by the reflector 811. The transflective mirror 813 is adapted to be mounted to the object 10 to partly reflect the second detection beam 14 received from the polarizing beam splitter 812 and partly permit passage of the second detection beam 14. The quarter-wave plate 814 is disposed between the polarizing beam splitter 812 and the transflective mirror 813 for passage of the second detection beam 14 received from the polarizing beam splitter 812 and reflected by the transflective mirror 813, and makes the second detection beam 14 passing therethrough have a phase shift. A part of the second detection beam 14 that was reflected by the transflective mirror 813 passes through the quarter-wave plate 814 again and reaches the polarizing beam splitter 812. The quarter-wave plate 814 is capable of changing polarization of the beam passing therethrough, so as to prevent the second detection beam 14 reflected by the transflective mirror 813 from passing through the polarizing beam splitter 812 and going back to the reflector 811 and the first beam splitter 21, which may adversely affect the result of detecting the movements and the rotations of the object 10. The polarizing beam splitter 812 reflects the second detection beam 14 that was reflected by the transflective mirror 813 and that passed through the quarter-wave plate 814 to the condensing lens 816. The position sensing detector 815 is disposed on a focal plane of the condensing lens 816 for receiving the second detection beam 14 that was reflected by the polarizing beam splitter 812 and that passed through the condensing lens 816, thereby detecting the y-axis rotation and the z-axis rotation of the object 10 using a principle applied to collimators. When a rotation angle of the object 10 with respect to the y-axis direction or the z-axis direction is w, variation of the optical path at the position sensing detector 815 would reflect a change of 2 w, achieving higher sensitivity of detection and thus higher precision for the detection result. The fourth detecting unit 82 is disposed to receive a part of the second detection beam 14 that was reflected by the second retroreflector 7 after passing through the polarizing beam splitter 812, the quarter-wave plate 814 and the transflective mirror 813 for detecting the second y-axis movement and the second z-axis movement of the object 10. In practice, the fourth detecting unit 82 may include a quadrant detector (QD), a position sensing detector (PSD), a charge-coupled device (CCD), a complementary metal-oxide-semiconductor (CMOS) sensor, or a charge injection device (CID). The first z-axis movement and the second z-axis movement are cooperatively used by the processor for comparison and analysis to obtain an x-axis rotation of the object 10 with respect to the x-axis direction (i.e., rotation around an axis parallel to the x-axis (X)). For example, when the first and second z-axis movements have the same value, it can be derived that the object 10 does not rotate with respect to the x-axis direction. When the first and second z-axis movements have different values, which indicates that different portions of the object 10 have different movements (moving distances) in the z-axis direction, it can be derived that the object 10 rotates with respect to the x-axis direction, and the x-axis rotation of the object 10 can thus be obtained. Furthermore, the precision of the obtained x-axis rotation of the object 10 may be enhanced by averaging the first and second y-axis movements of the object 10.

The first embodiment uses the beam splitter unit 2 to split the laser beam emitted by the light source unit into the first detection beam 13 and the second detection beam 14, and further uses the first retroreflector 4, the second retroreflector 7, the first detecting device 6 and the second detecting device 8 to measure the six degrees of freedom that include movements and rotations with respect to the three axes using a single system, which has a relatively simple structure and which is easy to use.

Figure 2:
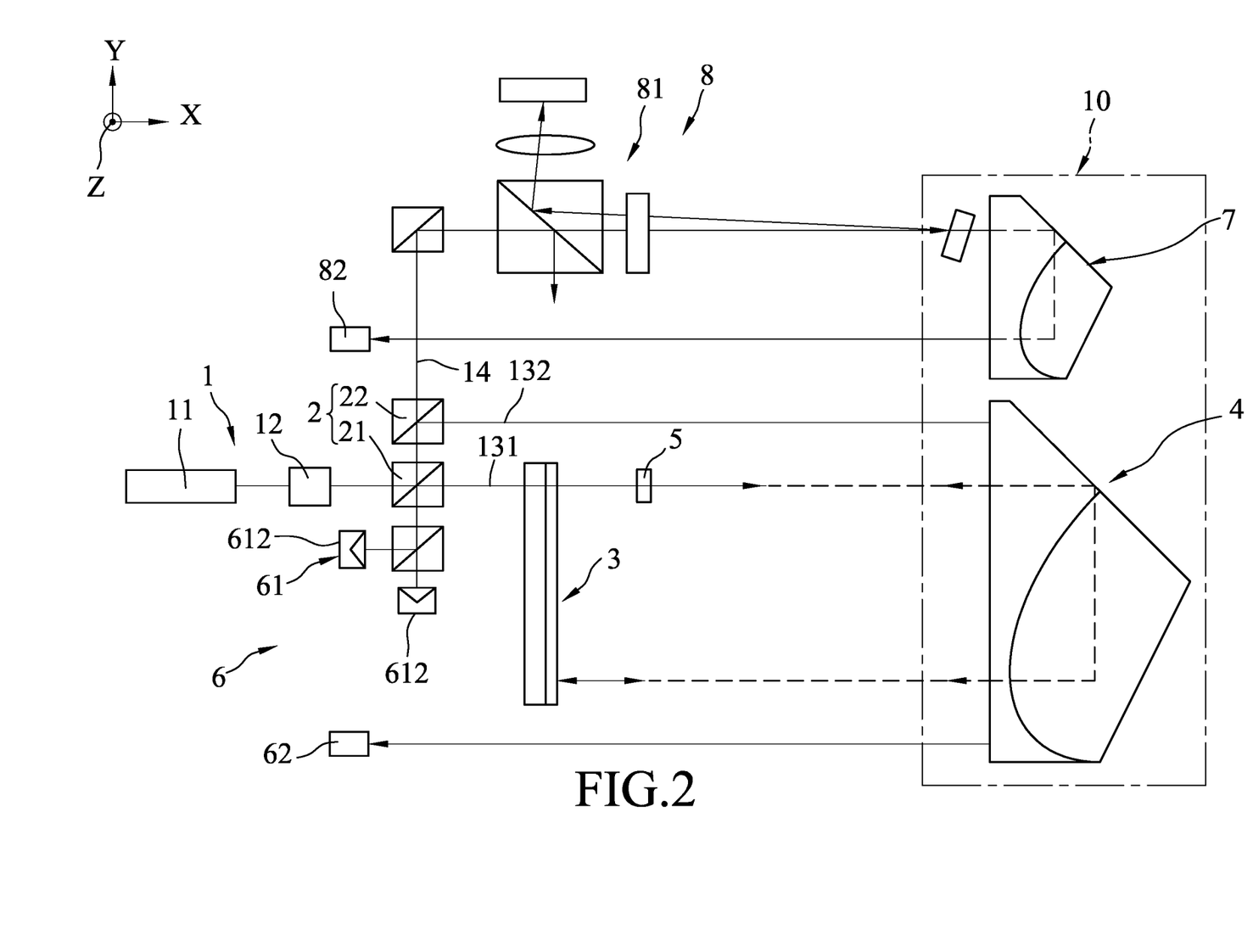
FIG. 2 is a schematic diagram illustrating a top view of a second embodiment of the laser interferometer system according to the disclosure.

Referring to FIG. 2, the second embodiment of the laser interferometer system according to this disclosure is shown to be similar to the first embodiment, and differs therefrom in that the beam splitter unit 2 of the second embodiment further includes a third beam splitter 22 that is separated from the first beam splitter 21 in the y-axis direction. In the second embodiment, the first beam splitter 21 splits the laser beam emitted by the light source unit 1 into two beams, one of which is a first split beam 131 that is used in the same way as the first detection beam 13 (see FIG. 1) in the first embodiment, and the other one of which is directed to the third beam splitter 22 in the y-axis direction. The third beam splitter 22 splits the beam coming from the first beam splitter 21 into two beams, one of which is the second detection beam 14 as described in the first embodiment, and the other one of which is a second split beam 132. In the second embodiment, the first split beam 131 and the second split beam 132 belong to the first detection beam set that is provided to the first retroreflector 4 in the x-axis direction. The second split beam 132 does not pass through the transflective unit 3 and the octadic-wave plate 5, and is directly transmitted to the first retroreflector 4. The first retroreflector 4 reflects the second split beam 132 received from the third beam splitter 22 toward the second detecting unit 62. In this embodiment, the second detecting unit 62 is disposed to receive the second split beam 132 reflected by the first retroreflector 4 for detecting the first y-axis movement and the first z-axis movement. That is to say, in the second embodiment, the first detection beam set includes the first split beam 131 with respect to which optical interference is introduced by the transflective unit 3 and the octadic-wave plate 5, and the second split beam 132 with respect to which optical interference is not introduced. Although the beam received by the second detecting unit 62 in the second embodiment is different from that in the first embodiment, the same effect can still be achieved.

Figure 3:
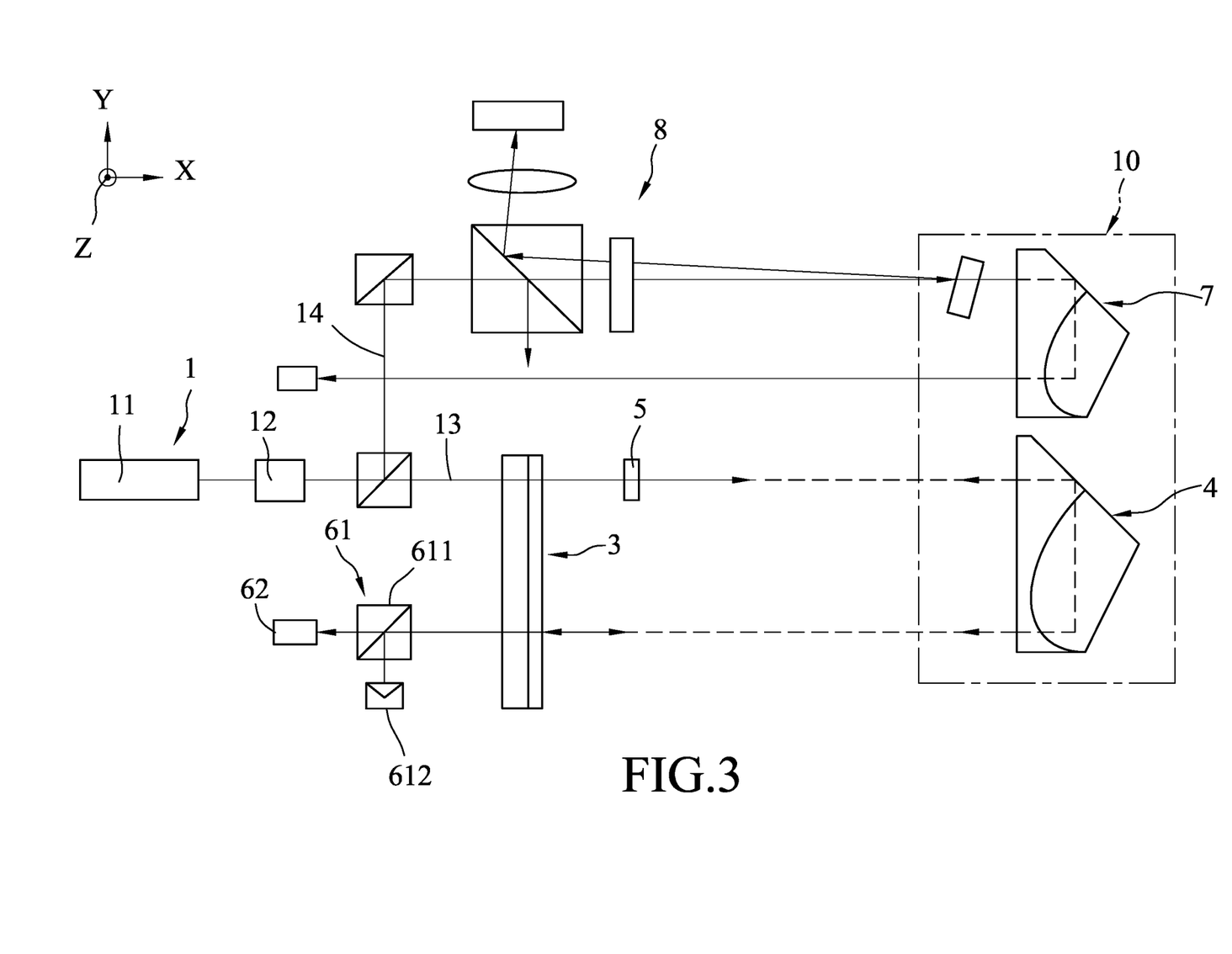
FIG. 3 is a schematic diagram illustrating a top view of a third embodiment of the laser interferometer system according to the disclosure.

Referring to FIG. 3, the third embodiment of the laser interferometer system according to this disclosure is shown to be similar to the first embodiment, and differs therefrom in that the first and second detecting units 61, 62 share some components in the third embodiment, and cooperate to detect the x-axis movement, the y-axis movement and the z-axis movement. In the third embodiment, the first detecting unit 61 includes the polarizing beam splitter 611 and a photodetector 612, and the second detecting unit 62 includes a quadrant detector (QD), a position sensing detector (PSD), a charge-coupled device (CCD), a complementary metal-oxide-semiconductor (CMOS) sensor, or a charge injection device (CID). The second detecting unit 62 and the photodetector 612 are so disposed that a line segment interconnecting the second detecting unit 62 and the polarizing beam splitter 611 and a line segment interconnecting the photodetector 612 and the polarizing beam splitter 611 are perpendicular to each other. The polarizing beam splitter 611 splits the first detection beam 13 that was reflected by the first retroreflector 4, that passed the transflective unit 3 and that is in a form of the interference beam into two split interference beams that are perpendicular to each other in polarization. The photodetector 612 and the second detecting unit 62 respectively receive the split interference beams and generate signals in response to the received split interference beams. The first y-axis movement and the first z-axis movement of the object 10 may be obtained by processing and analyzing the signals generated by the second detecting unit 62. The x-axis movement of the object 10 may be obtained by processing and analyzing the signals generated by both of the photodetector 612 and the second detecting unit 62. Accordingly, the third embodiment integrates the functions of the first detecting unit 61 and the second detecting unit 62 together and thus has a simpler structure than the first embodiment.

Figure 4:
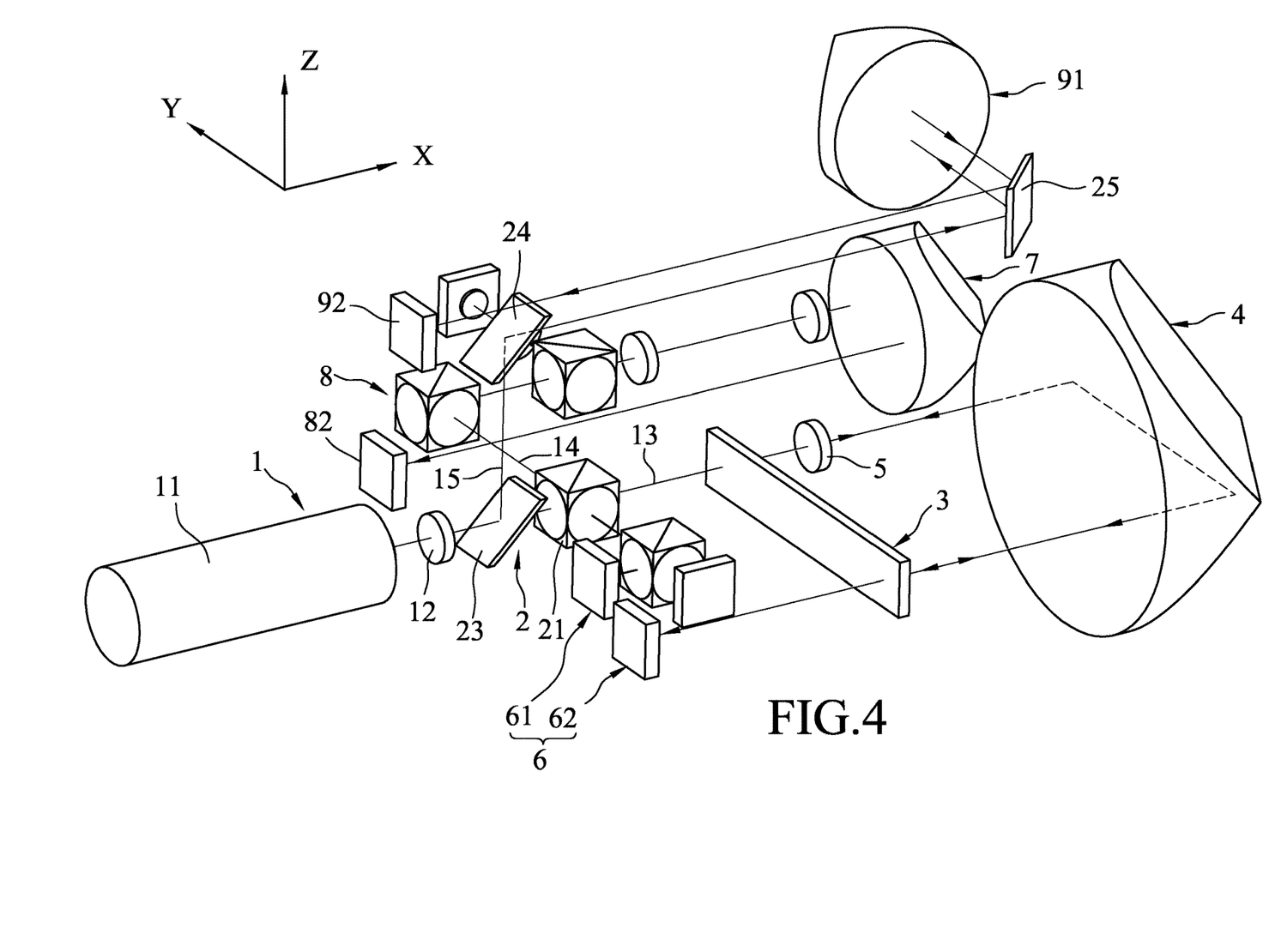
FIG. 4 is a perspective view of a fourth embodiment of the laser interferometer system according to the disclosure.
Figure 5:
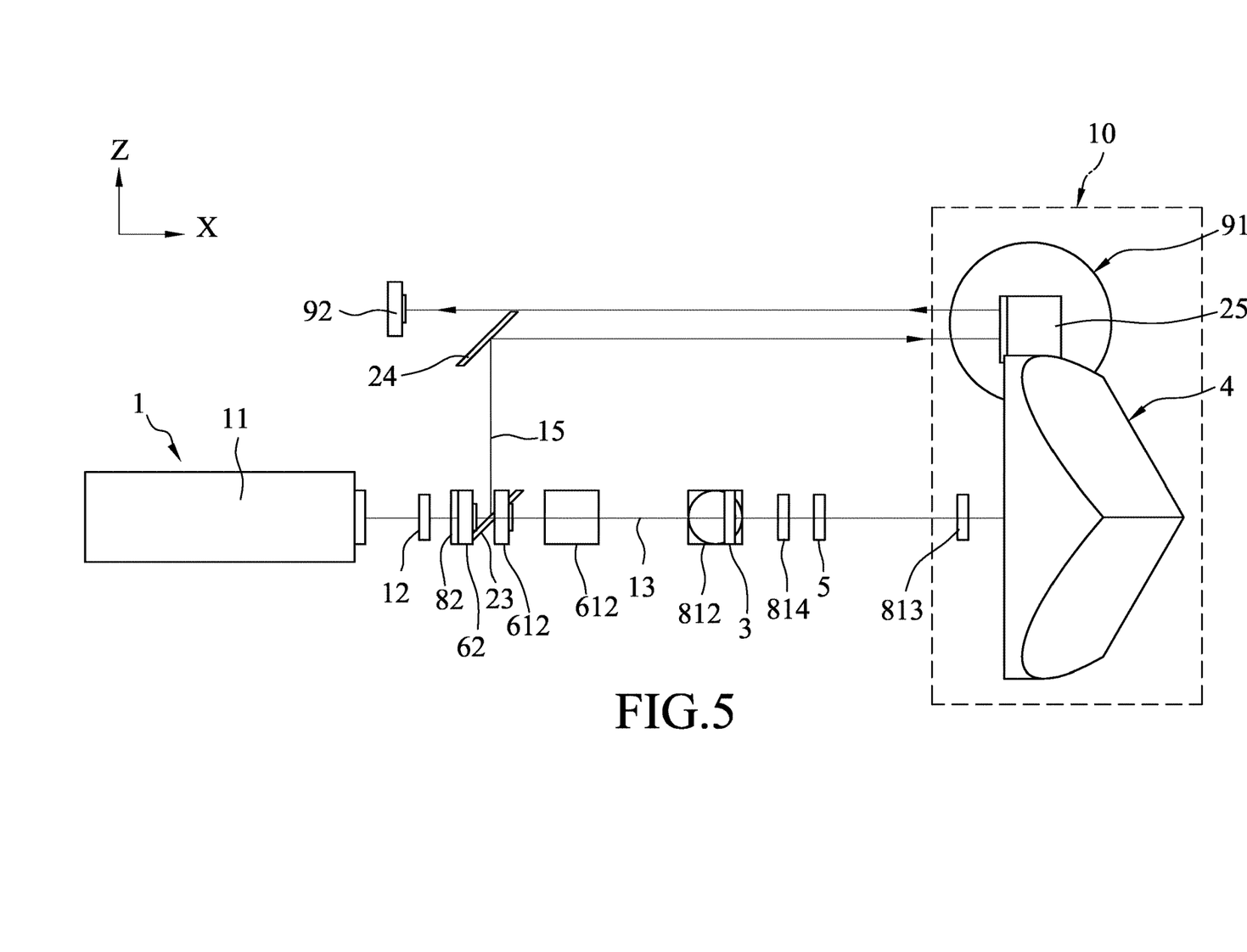
FIG. 5 is a schematic diagram illustrating a side view of the fourth embodiment.

Referring to FIGS. 4 and 5, the fourth embodiment of the laser interferometer system according to this disclosure is shown to be similar to the first embodiment, and differs therefrom in that: 1) the beam splitter unit 2 further includes a fourth beam splitter 23 disposed between the optical isolator 12 and the first beam splitter 21, a first reflective mirror 24 disposed above the fourth beam splitter 23 (i.e., separated from the fourth beam splitter 23 in the z-axis direction), and a second reflective mirror 25 disposed in front of the first reflective mirror 24 (i.e., separated from the first reflective mirror 24 in the x-axis direction); and 2) the second embodiment of the laser interferometer system further includes a third retroreflector 91 disposed above the second retroreflector 7 (i.e., separated from the second retroreflector 7 in the z-axis direction), and an auxiliary detecting unit 92. The third retroreflector 91 is adapted to be mounted to the object 10 so as to move or rotate with the object 10, and has a surface facing the y-axis direction for entrance of the third detection beam 15. The auxiliary detecting unit 92 may be a quadrant detector (QD), a position sensing detector (PSD), a charge-coupled device (CCD), a complementary metal-oxide-semiconductor (CMOS) sensor, or a charge injection device (CID).

In the fourth embodiment, the fourth beam splitter 23 permits passage of a part of the laser beam emitted by the light source unit 1 to the first beam splitter 21 to form the first detection beam 13 and the second detection beam 14 as described in the first embodiment, and reflects a part of the laser beam emitted by the light source unit 1 toward the first reflective mirror 24 in the z-axis direction, thereby forming a third detection beam 15. Then, the third detection beam 15 is transmitted to the third retroreflector 91 through reflections by the first reflective mirror 24 and the second reflective mirror 25. Subsequently, the third retroreflector 91 reflects the third detection beam 15 received from the second reflective mirror 25 in the y-axis direction back toward the second reflective mirror 25, and the second reflective mirror 25 reflects the third detection beam 15 toward the auxiliary detecting unit 92. The auxiliary detecting unit 92 receives the third detection beam 15 reflected by the second reflective mirror 25, and generates signals in response to the third detection beam 15 received thereby for analysis by the processor to obtain movement of the object 10 in the y-axis direction and the z-axis direction. The detection result from the auxiliary detecting unit 92 can be used for comparison and analysis with the detection results from the second detecting unit 62 and the fourth detecting unit 82, so as to calculate the x-axis rotation (rotation angle with respect to the x-axis direction) of the object 10 and a position of a center of the x-axis rotation with higher precision.

Therefore, the laser beam emitted by the light source unit 1 is split into a first detection beam set (i.e., the first detection beam 13), a second detection beam set (i.e., the second detection beam 14) and a third detection beam set (i.e., the third detection beam 15) that are emitted to the first, second and third retroreflectors 4, 7, 91, respectively.

Briefly speaking, the fourth embodiment adds a third retroreflector 91 to cooperate with the first and second retroreflectors 4, 7 to enhance precision of the acquired result of the x-axis rotation of the object 10. To achieve this effect, an additional optical path (i.e., the third detection beam 15) is added for the third retroreflector 91.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A laser interferometer system for measuring six degrees of freedom of an object that linearly moves in an x-axis direction, said laser interferometer system comprising:

a light source unit for emitting a laser beam in the x-axis direction;

a beam splitter unit disposed downstream of said light source unit to split the laser beam emitted by said light source unit into a plurality of detection beams that are classified into at least a first detection beam set and a second detection beam set;

a transflective unit disposed downstream of said beam splitter unit for receiving the first detection beam set from said beam splitter unit, and configured to permit passage of the first detection beam set received from said beam splitter unit;

a first retroreflector to be mounted to the object, and disposed downstream of said transflective unit to reflect the first detection beam set passing through said transflective unit and traveling in the x-axis direction back toward said transflective unit;

a first detecting device disposed on an opposite side of said transflective unit with respect to said first retroreflector for receiving the first detection beam set reflected by said first retroreflector, and including a first detecting unit for detecting an x-axis movement of the object in the x-axis direction based on a part of the first detection beam set received thereby, and a second detecting unit for detecting a first y-axis movement and a first z-axis movement of the object respectively in a y-axis direction and a z-axis direction based on a part of the first detection beam set received thereby, wherein the x-axis direction, the y-axis direction and the z-axis direction are perpendicular to each other;

a second retroreflector to be mounted to the object, and disposed to reflect the second detection beam set traveling in the x-axis direction;

a second detecting device disposed to receive the second detection beam set reflected by said second retroreflector, and including a third detecting unit for detecting a y-axis rotation and a z-axis rotation of the object with respect to the y-axis direction and the z-axis direction, respectively, based on a part of the second detection beam set received thereby, and a fourth detecting unit for detecting a second y-axis movement and a second z-axis movement of the object respectively in the y-axis direction and the z-axis direction based on a part of the second detection beam set received thereby, wherein the first z-axis movement and the second z-axis movement are cooperatively used to obtain an x-axis rotation of the object with respect to the x-axis direction; and an octadic-wave plate disposed between said transflective unit and said first retroreflector to cause beams resulting from reflections of the first detection beam set to form an interference beam having an orthogonal phase-shifting fringe, wherein said first detecting unit includes:

a polarizing beam splitter disposed to split the interference beam formed from the first detection beam set that was reflected by said first retroreflector followed by passing through said octadic-wave plate and said transflective unit into two split interference beams that are perpendicular to each other in polarization; and two photodetectors disposed to receive the split interference beams, respectively, and configured to generate, in response to the split interference beams received thereby, signals to be used for analysis to obtain the x-axis movement of the object.

2. The laser interferometer system of claim 1, wherein said second detecting unit is disposed to receive the first detection beam set which did not pass through said octadic-wave plate and passed through said transflective unit in a final reflection by said first retroreflector, so as to detect the first y-axis movement and the first z-axis movement of the object.

3. The laser interferometer system of claim 2, wherein said second detecting unit includes one of a quadrant detector, a position sensing detector, a charge-coupled device, a complementary metal-oxide-semiconductor sensor, and a charge injection device.

4. The laser interferometer system of claim 1, wherein the first detection beam set includes a first split beam that passes through said transflective unit and said octadic-wave plate and that travels toward said first retroreflector, and a second split beam that does not pass through said transflective unit and said octadic-wave plate and that directly travels toward said first retroreflector;
wherein the interference beam that is received by said first detecting unit is created by the first split beam that passed through said octadic-wave plate; and
wherein said second detecting unit is disposed to receive the second split beam reflected by said first retroreflector for detecting the first y-axis movement and the first z-axis movement of the object.

5. The laser interferometer system of claim 4, wherein said second detecting unit includes one of a quadrant detector, a position sensing detector, a charge-coupled device, a complementary metal-oxide-semiconductor sensor, and a charge injection device.

6. The laser interferometer system of claim 1, wherein said third detecting unit includes:
a polarizing beam splitter disposed to permit passage of the second detection beam set received from said beam splitter unit;
a transflective mirror to be mounted to the object to partly reflect the second detection beam set received from said polarizing beam splitter;
a quarter-wave plate disposed between said polarizing beam splitter and said transflective mirror for passage of the second detection beam set received from said polarizing beam splitter and reflected by said transflective mirror; and
a position sensing detector disposed on a side of said polarizing beam splitter;
wherein said polarizing beam splitter is disposed to reflect the part of the second detection beam set that was reflected by said transflective mirror toward said position sensing detector for detecting the x-axis rotation and the y-axis rotation of the object.

7. The laser interferometer system of claim 6, wherein said fourth detecting unit is disposed to receive a part of the second detection beam set that was reflected by said second retroreflector after passing through said polarizing beam splitter, said quarter-wave plate and said transflective mirror for detecting the second y-axis movement and the second z-axis movement of the object.

8. The laser interferometer system of claim 7, wherein said fourth detecting unit includes one of a quadrant detector, a position sensing detector, a charge-coupled device, a complementary metal-oxide-semiconductor sensor, and a charge injection device.

9. The laser interferometer system of claim 1, wherein said transflective unit includes a glass substrate disposed between said beam splitter unit and said first retroreflector, and a reflective film formed on a surface of said glass substrate facing said first retroreflector.

10. A laser interferometer system for measuring six degrees of freedom of an object that linearly moves in an x-axis direction, said laser interferometer system comprising:
a light source unit for emitting a laser beam in the x-axis direction;
a beam splitter unit disposed downstream of said light source unit to split the laser beam emitted by said light source unit into a plurality of detection beams that are classified into at least a first detection beam set and a second detection beam set;
a transflective unit disposed downstream of said beam splitter unit for receiving the first detection beam set from said beam splitter unit, and configured to permit passage of the first detection beam set received from said beam splitter unit;
a first retroreflector to be mounted to the object, and disposed downstream of said transflective unit to reflect the first detection beam set passing through said transflective unit and traveling in the x-axis direction back toward said transflective unit;
a first detecting device disposed on an opposite side of said transflective unit with respect to said first retroreflector for receiving the first detection beam set reflected by said first retroreflector, and including a first detecting unit for detecting an x-axis movement of the object in the x-axis direction based on a part of the first detection beam set received thereby, and a second detecting unit for detecting a first y-axis movement and a first z-axis movement of the object respectively in a y-axis direction and a z-axis direction based on a part of the first detection beam set received thereby, wherein the x-axis direction, the y-axis direction and the z-axis direction are perpendicular to each other;
a second retroreflector to be mounted to the object, and disposed to reflect the second detection beam set traveling in the x-axis direction;
a second detecting device disposed to receive the second detection beam set reflected by said second retroreflector, and including a third detecting unit for detecting a y-axis rotation and a z-axis rotation of the object with respect to the y-axis direction and the z-axis direction, respectively, based on a part of the second detection beam set received thereby, and a fourth detecting unit for detecting a second y-axis movement and a second z-axis movement of the object respectively in the y-axis direction and the z-axis direction based on a part of the second detection beam set received thereby, wherein the first z-axis movement and the second z-axis movement are cooperatively used to obtain an x-axis rotation of the object with respect to the x-axis direction; and
an octadic-wave plate disposed between said transflective unit and said first retroreflector to cause beams resulting from reflections of the first detection beam set to fotin an interference beam having an orthogonal phase-shifting fringe, so as to form an interference beam from the first detection beam set with different phases;
wherein said first detecting unit includes:
a polarizing beam splitter disposed to split the interference beam formed by the first detection beam set which did not pass through said octadic-wave plate and passed through said transflective unit in a final reflection by said first retroreflector into two split interference beams that are perpendicular to each other in polarization; and a photodetector disposed to cooperate with said second detecting unit to receive the split interference beams, respectively;

wherein said photodetector and said second detecting unit cooperate to generate, in response to the split interference beams received thereby, signals to be used for analysis to obtain the x-axis movement, the first y-axis movement and the first z-axis movement of the object.

11. A laser interferometer system for measuring six degrees of freedom of an object that linearly moves in an x-axis direction, said laser interferometer system comprising:

a light source unit for emitting a laser beam in the x-axis direction;

a beam splitter unit disposed downstream of said light source unit to split the laser beam emitted by said light source unit into a plurality of detection beams that are classified into at least a first detection beam set and a second detection beam set;

a transflective unit disposed downstream of said beam splitter unit for receiving the first detection beam set from said beam splitter unit, and configured to permit passage of the first detection beam set received from said beam splitter unit;

a first retroreflector to be mounted to the object, and disposed downstream of said transflective unit to reflect the first detection beam set passing through said transflective unit and traveling in the x-axis direction back toward said transflective unit;

a first detecting device disposed on an opposite side of said transflective unit with respect to said first retroreflector for receiving the first detection beam set reflected by said first retroreflector, and including a first detecting unit for detecting an x-axis movement of the object in the x-axis direction based on a part of the first detection beam set received thereby, and a second detecting unit for detecting a first y-axis movement and a first z-axis movement of the object respectively in a y-axis direction and a z-axis direction based on a part of the first detection beam set received thereby, wherein the x-axis direction, the y-axis direction and the z-axis direction are perpendicular to each other;

a second retroreflector to be mounted to the object, and disposed to reflect the second detection beam set traveling in the x-axis direction; and a second detecting device disposed to receive the second detection beam set reflected by said second retroreflector, and including a third detecting unit for detecting a y-axis rotation and a z-axis rotation of the object with respect to the y-axis direction and the z-axis direction, respectively, based on a part of the second detection beam set received thereby, and a fourth detecting unit for detecting a second y-axis movement and a second z-axis movement of the object respectively in the y-axis direction and the z-axis direction based on a part of the second detection beam set received thereby, wherein the first z-axis movement and the second z-axis movement are cooperatively used to obtain an x-axis rotation of the object with respect to the x-axis direction;

wherein the detection beams are classified into the first detection beam set, the second detection beam set, and a third detection beam set;

said laser interferometer system further comprising:

a third retroreflector to be mounted to the object for reflecting the third detection beam set traveling in the y-axis direction; and an auxiliary detecting unit disposed to receive the third detection beam set reflected by said third retroreflector to generate a detection result to be cooperatively used with detection results obtained from said second and fourth detecting units to obtain a position of a center of the x-axis rotation of the object.

12. The laser interferometer system of claim 11, wherein said first and second retroreflectors are separated from each other in the y-axis direction, and the third retroreflector is separated from said second retroreflector in the z-axis direction.

13. The laser interferometer system of claim 12, wherein:

said first retroreflector has a surface facing the x-axis direction for entrance of the first detection beam set;

said second retroreflector has a surface facing the x-axis direction for entrance of the second detection beam set; and said third retroreflector has a surface facing the y-axis direction for entrance of the third detection beam set.

* * * * *